United States Patent [19]

Schultz et al.

[11] Patent Number: 5,056,019

[45] Date of Patent: Oct. 8, 1991

[54] AUTOMATED PURCHASE REWARD ACCOUNTING SYSTEM AND METHOD

[75] Inventors: John Schultz, Stamford; Donald Irion, Westport, both of Conn.

[73] Assignee: Citicorp POS Information Servies, Inc., Stamford, Conn.

[21] Appl. No.: 400,650

[22] Filed: Aug. 29, 1989

[51] Int. Cl.$^5$ .............................................. G06F 15/21
[52] U.S. Cl. ....................................... 364/405; 364/401
[58] Field of Search .................. 364/401, 405; 235/383

[56] References Cited

U.S. PATENT DOCUMENTS

| | | | |
|---|---|---|---|
| 3,505,646 | 4/1970 | Affel, Jr. et al. | 364/900 |
| 3,716,697 | 2/1973 | Weir | 235/383 |
| 3,959,624 | 5/1976 | Kaslow | 235/494 X |
| 4,247,759 | 1/1981 | Yuris et al. | 235/381 |
| 4,365,148 | 12/1982 | Whitney | 235/383 |
| 4,415,065 | 11/1983 | Sandstedt | 186/39 |
| 4,415,802 | 11/1983 | Long | 235/382 |
| 4,419,573 | 12/1983 | von Geldern | 235/383 |
| 4,554,446 | 11/1985 | Murphy et al. | 235/385 X |
| 4,670,853 | 6/1987 | Stepien | 364/705.01 |
| 4,672,377 | 6/1987 | Murphy et al. | 340/825.34 |
| 4,674,041 | 6/1987 | Lemon et al. | 364/401 |
| 4,703,423 | 10/1987 | Bado et al. | 364/400 |
| 4,722,054 | 1/1988 | Yorozu et al. | 364/401 |
| 4,723,212 | 2/1988 | Mindrum et al. | 364/401 |
| 4,750,119 | 6/1988 | Cohen et al. | 364/401 |
| 4,791,281 | 12/1988 | Johnsen et al. | 235/383 |
| 4,882,675 | 11/1989 | Nichtberger et al. | 364/401 |
| 4,885,685 | 12/1989 | Wolfberg et al. | 364/401 |
| 4,908,761 | 3/1990 | Tai | 364/401 |
| 4,910,672 | 3/1990 | Off et al. | 364/405 |
| 4,941,090 | 7/1990 | McCarthy | 364/405 |
| 4,949,256 | 8/1990 | Humble | 364/401 |

FOREIGN PATENT DOCUMENTS

| | | |
|---|---|---|
| 0093619 | 2/1977 | Japan . |
| 0120690 | 4/1980 | Japan . |
| 0114068 | 9/1981 | Japan .................................. 364/405 |
| 0183465 | 10/1984 | Japan . |
| 0184965 | 10/1984 | Japan . |
| 0271569 | 12/1986 | Japan . |
| 1437883 | of 1976 | United Kingdom . |
| 2105075 | of 1983 | United Kingdom . |

OTHER PUBLICATIONS

Frozen Food Age, Feb. 1987.
Supermarket News, vol. 38, No. 33, Aug. 14, 1988.
Supermarket News, May 11, 1987.
Supermarket News, vol. 37, No. 8, Feb. 23, 1987.
Richmond Times Dispatch, Feb. 8, 1987.
Electronic Coupons, Target Marketing, Jul. 1987.
Chain Store Age Executive, Sep. 1987.
Progressive Grocer, vol. 66, No. 5, May 1987.
Supermarket Business, vol. 42, No. 2, Part One of Two Parts, Feb. 1987.
Kelley, "Point of Sale Systems: More Than Meets the Eye", *Infosystems*, vol. 27, No. 3, 3/80.
Sun, "Checking Out the Customer", Washington Post, 7/9/89.
Supermarket News, 11 Feb. 1985, "Rice, Other Houston Factors Join Coupon Promotion", p. 6, (abstract only).
The Business Journal-Milwaukee, vol. 3, No. 33, s1, 2 Jun. 1986, Connole, "Sonoco Hopes for More Business with 'Frequent Buyer' Program", p. 21.
Wall Street Journal 3 Star, Eastern, 7 Aug. 1986, "Grocery Stores Copy Airlines With Frequent-Buyer Bonuses", p. 21, (abstract only).

(List continue on next page.)

Primary Examiner—Jerry Smith
Assistant Examiner—David Huntley
Attorney, Agent, or Firm—Howrey & Simon

[57] ABSTRACT

A marketing method for providing manufacturer purchase reward offers by automatically tracking the purchases of member consumers through the use of bar-coded membership cards and using the purchase records in a data processing system to determine if the required purchases have been made to earn a reward. Each member consumer receives a reward booklet disclosing the available reward offers, a periodic status report indicating the member consumer's progress toward earning rewards, and a reward certificate for those rewards earned.

21 Claims, 2 Drawing Sheets

OTHER PUBLICATIONS

Advertising Age, 16 Mar. 1987, "S&H, Saffer Reward Frequent Shoppers", p. 22, (abstract only).
Marketing & Media Decisions, vol. 22, Sep. 1987, "Registered Savings (supermarket in-store frequent-buyer program called Catalog Cash)", p. 20.
TWA Frequent Flight Bonus Program, brochure, publication date 1987.
Washington Post, 14 Jun. 1989, "Giant to Test Supermarket Cash Rebates", pp. A1 and A32 (abstract only).
PR Newswire, 16 Jun. 1989, "Catalina Marketing Corp. Outmaneuvers Citicorp POS, Industry Leader Launches Frequent Shopper Program in Electronic Network of 2,500 Stores".
Adweek's Marketing Week, vol. 30, 10 Jul. 1989, Laurie Petersen, "Frequent Buyer Mania".
Food & Beverage Marketing, vol. 8, Aug. 1989, "Scanning a New Horizon", p. 32.
Washington Post, vol. 112, No. 285, 16 Aug. 1989, Mark Potts, "Giant to Widen 'Frequent Buyer' Rebate Test", p. 12.
Dairy Food, Nov. 1989, "Frequent Buyer Programs Get Off the Ground", p. 64.
PR Newswire, 30 Jan. 1990, "SSI Signs Frequent Buyer Software Development/Processing Agreement with GTE", p. 1, (abstract only).
Los Angeles Times, 3 Mar. 1990, Jesus Sanchez, "Bookstores Lift Page From Airline Marketing Manual", p. 2.
San Francisco Chronicle, 18 Jun. 1990, "Neiman Marcus Frequent-Buyer Plan", p. 23, (abstract only).
Advertising Age, 6 Aug. 1990, "Frequent Shopper Programs Ripen", p. 21, (abstract only).
Los Angeles Times, vol. 109, col. 5, 13 Sep. 1990, Nancy Rivera, "Ralphs and Lucky Scrap Frequent--Shopper Plans", p. D4 (citation only).
Supermarket News, 17 Sep. 1990, "Four Chains Drop Frequent Shopper", p. 1.

AUTOMATED PURCHASE REWARD ACCOUNTING SYSTEM AND METHOD

FIELD OF THE INVENTION

This invention relates generally to automatic tracking of consumer purchases and providing fulfillment and redemption of purchase incentives. More particularly, this invention relates to computerized redemption systems utilizing universal product and consumer identification codes.

BACKGROUND AND OBJECTS OF THE INVENTION

Producers of food, drugs, mass merchandising items and related products in the packaged goods industry use various marketing techniques to encourage consumer purchases and establish brand loyalty. Two of the most commonly used purchase incentives are the rebate offer and the discount coupon. Both of these purchase incentive media, under current systems, present significant problems in distribution, fulfillment and redemption.

The rebate offer essentially offers a refund from the manufacturer to the consumer for the purchase of a specified quantity of a particular product. Because the rebate offer often requires the purchase of more than one of the rebated product, it serves as an enticement for the consumer to continue purchasing the rebated product. This multiple purchase requirement has more potential for developing sales volume and brand loyalty than incentives, such as the discount coupon, which encourage the one-time purchase of a product. However, the incentive created by rebate offers is diminished by the inconvenience in fulfilling offer requirements and the unreliable nature of the redemption process. These shortcomings reduce the value of the rebate offer to both the consumer and the manufacturer.

Regarding the offer requirements, the consumer is typically required to save proofs-of-purchase from product packaging and mail them with an associated offer form to the manufacturer to earn the rebate. Many consumers find it too inconvenient to remember to remove the proofs-of-purchase from products purchased over an extended period of time and save them with the associated form. Additionally, the postage for mailing the proofs of purchase diminishes the value of the rebate to the consumer.

Another disadvantage of the current rebate system is that some consumers from different households pool their proofs-of-purchase to submit for rebate. Although this practice results in quicker rebate redemptions for these consumers, it defeats the purpose of the manufacturer for offering multiple purchase rebates. Consumers engaging in this practice will likely switch brands to take advantage of other rebate offers when, together, each participating consumer has to purchase only one of the rebated products. Hence, it is an object of the invention to provide a multiple purchase incentive method which assures participating manufacturers that a single household purchases the required quantity to earn the purchase rebate.

When a consumer does perform the necessary steps to receive a rebate, he must typically wait several weeks to receive the rebate from the manufacturer. In addition, manufacturers often delegate rebate redemption processing to coupon clearinghouses. These clearinghouses often use unskilled labor to process coupons and rebates in large volumes. As a result, a substantial percentage of redemption requests are lost or improperly processed. In view of the inconvenience and lack of reliability to consumers of mailing the necessary documents to the manufacturer to receive a rebate, it is still another object of the invention to provide a system that automatically credits a consumer's purchases toward a purchase reward without the mailing requirements.

Regarding coupons as purchase incentives, a brief description of the current coupon distribution and redemption system and the prior art developments in that area will indicate further advantages of the present invention as a method for effecting purchase reward offers. Typically, coupons are distributed to the public through newspapers, magazines and direct mail. The consumer clips the coupon from the publication and presents it when purchasing items at the check-out counter of a retail store. At least in theory, the check-out clerk inspects the coupon to ensure that all the conditions for its redemption are met. A typical condition for redemption is the purchase of a specified item before a specified expiration date. If the coupon is validly presented, the clerk deducts the coupon value from the consumer's bill.

In the reimbursement process, retail store personnel periodically gather all redeemed coupons, sort them according to manufacturer, and tally the individual totals for reimbursement. The calculated figures and coupon groupings are usually audited by a coupon clearinghouse which then sends them onto the manufacturers. The manufacturers then reimburse the retail store for the redeemed coupons plus a standard handling charge.

Through the years, members of the packaged goods industry have experienced many problems with the coupon distribution and redemption system. For example, in the area of distribution, manufacturers have found that few consumers will go through all the steps necessary to redeem their coupons. More commonly, many consumers forget to bring coupons that they have clipped and saved to the store.

This consumer behavior defeats the manufacturer's purpose for offering the purchase incentive. A manufacturer distributes coupons with the expectation that the coupons will induce sales of its product by offering a discount. However, when the coupon is forgotten or disregarded, the consumer is usually not aware of the incentive when he is selecting a product among different brands at the retail store.

Of course, not all consumers forego the benefit of coupons. In fact, some bring several coupons to the retail store to take advantage of another weakness of the coupon system. Because the verification of redemption conditions is performed by the check-out clerk, a consumer can usually overwhelm the clerk by presenting so many coupons that it is impractical to verify the required purchases for all of them. Typically, the check-out clerk does not have the time to verify that the consumer has bought the correct size or quantity of the correct brand for each of a dozen coupons. As a result, some coupons are misredeemed without the required purchase.

The auditing and reimbursement stages of the coupon system also present several problems. First, unscrupulous persons have used deficiencies in the coupon system to fraudulently submit unredeemed coupons to the manufacturers for reimbursement. For example, some retail store personnel have purchased large quantities of unredeemed coupons from collectors at prices below their face value. The store personnel then return these coupons to the manufacturers for reimbursement at full face value. Although this practice is sometimes used to reap large profits, it is commonly used on a smaller scale to cover shrinkage losses of the retail store. Nevertheless, these fraudulent practices cost manufacturers millions of dollars a year.

Another source of trouble in the coupon system is the coupon clearinghouse. While both the manufacturer and the retail stores rely on the coupon clearinghouse to impartially verify the tallied figures for coupon reimbursement, the volume of coupons audited often requires the clearinghouse to use cheap, unskilled labor, often resulting in erroneous totals.

In the prior art, several methods have been devised to alleviate problems in the coupon system. With the integration of computer systems into the packaged goods industry, there have been a number of attempts to combat the problems in the coupon system through application of available computer technology.

Although equipment used to read machine-readable codes, such as the Universal Product Code (UPC) barcode, was first designed to improve inventory control and checkout efficiency, U.S. Pat. No. 3,959,624 to Kaslow et al. discloses the use of machine-readable codes on coupons. Coupons bar-coded with the UPC can be read accurately by scanning equipment. The information picked up from the coupon is compared with stored information read from the bar-codes of purchased products. The controlling computer system can determine the validity of the coupon redemption and either allow or inhibit a discount accordingly. Thus, the losses associated with a check-out clerk's failure to verify satisfaction of coupon conditions can be avoided.

In addition, the Kaslow et al. system stores records of the manufacturer names and discount amounts of redeemed coupons to be used later for coupon auditing and reimbursement purposes. With these computer generated totals, the problems associated with fraud and clearinghouse auditing errors are greatly reduced.

In the area of coupon distribution, U.S. Pat. No. 4,554,446 to Murphy et al. reveals two purchase incentive techniques employing computer systems. In the first method, a computerized printer produces machinereadable coupons at the supermarket so that a consumer does not have to remember to bring them. The system can be controlled by store personnel or adapted to receive selections from the consumer directly. Moreover, Murphy et al. suggests the use of machine-readable customer identification cards to limit those consumers eligible to obtain the computer-generated coupons.

The second computer-based purchase incentive method disclosed by Murphy et al. relates to so-called self-liquidating premiums. A self-liquidating premium is essentially an offer from a manufacturer to consumers who purchase a particular product to buy a different product at a substantial savings. Because the premium is offered to entice purchases of the required product, the premium product is usually offered at a break-even price; hence, it is self-liquidating.

In order to take advantage of the premium offer, a consumer buys a specified product. The advertisement for the premium product is usually on the package of the required product. Under the typical method, the consumer must then send the manufacturer some proof of purchase and the premium purchase price. These items are usually sent by mail from the consumer's home.

Murphy et al. discloses a computer system for generating machine-readable sales vouchers to order the premium product at the retail store. The store computer stores files related to the premium offers. When a consumer makes the required purchase, he presents the sales voucher and the payment of the premium purchase price. The store computer records the transaction so that the retail store can order the premium product directly for the consumer. The retail store becomes a point of purchase for premium products, making the offer more convenient for the consumer and thereby increasing the incentive value of the premium offer.

Another coupon distribution technique utilizing a computer system is disclosed in U.S. Pat. No. 4,723,212 to Mindrum et al. Recognizing that a manufacturer desires to distribute coupons to consumers who purchase a competitor's products, Mindrum et al. teaches a system for generating a machine-readable coupon for a product when the bar-code of a competitive product is read by the check-out terminal scanner. Hence, the manufacturer is able to distribute a coupon directly to the consumer it is targeting, a customer of the competition.

Another system exists in the prior art which uses a computer system to offer purchase incentives without distributing coupons. In the system, the consumer is issued a customer identification card with an encoded consumer identification code in machine-readable format. A list of products subject to discounts is distributed at the retail store. When a valid identification card is scanned at the check-out terminal, the store computer automatically discounts those items on the list according to stored product files.

Each prior art system addresses some of the problems related to the coupon distribution and redemption system. However, the prior art devices and methods focus on isolated coupon transactions. None of the prior art systems provides a method for continuing the purchase incentive after the sales transaction involving the coupon is completed. Accordingly, it is further object of the invention to provide a method for encouraging continued purchases of targeted products beyond the one-time incentive of prior coupon systems.

SUMMARY OF THE INVENTION

The present invention resides in a marketing program for rewarding specific purchase behavior and increasing consumer brand loyalty for manufacturers who participate in the program. The present invention also provides the system components necessary to implement this marketing program.

Manufacturers are solicited to provide incentive rewards for purchases of specific quantities of their products. The purchase incentives are compiled into a reward booklet which is distributed periodically directly to consumers at their homes and at participating retail outlets. The offers include descriptions of the participating products and the conditions for fulfillment of the purchase reward offer requirements.

A consumer joins the program and receives a consumer identification code and a member identification card. This consumer identification code can be encoded in machine-readable code on the identification card, in which case the code is scanned at the check-out counter when the consumer purchases his products. Alternatively, the consumer identification code can be in non machinereadable format, in which case the code is entered manually on the check-out counter terminal. The consumer identification code is used to identify the consumer's purchases in purchase records stored in a program data collector at the retail store.

The purchase records of the UPC codes for the products purchased by identified consumers at the participating retail outlets are periodically transferred to a program management computer system maintained by a marketing firm. In the program management computer system, the consumer identified purchase information is compared to the offer descriptions of the participating products and recorded for each consumer. Each consumer is sent a periodic summary of all his purchases of the participating products and a reward certificate for the rewards earned. This reward certificate can be a negotiable check or can be adapted for redemption at a participating retail store. The manufacturers of the participating products are invoiced for their portion of the rewards earned.

Reward certificates that are adapted for redemption at a participating retail store are redeemed by the consumer using the identification card and consumer identification code. The retail outlet then forwards the certificates to the marketing firm for reimbursement. The reward certificates may have machine-readable codes, in which case, the retail store can record the redemption transactions on the in-store computer system.

DESCRIPTION OF THE PREFERRED EMBODIMENTS

Figure 1:
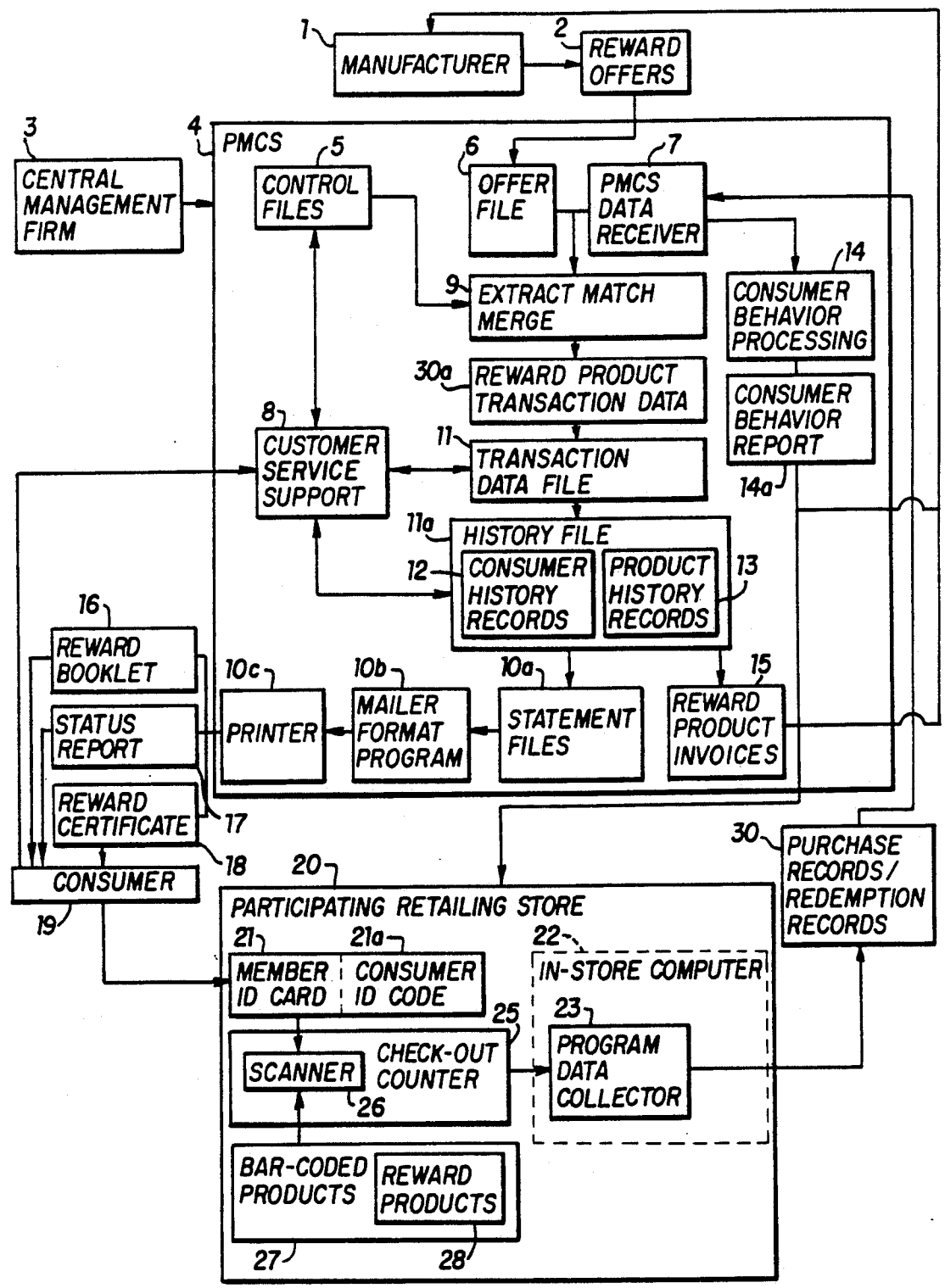
FIG. 1 shows a block diagram of the interaction between the various system components in the marketing program of the present invention.

Referring to FIG. 1, the marketing method of the present invention involves four groups of participants comprising manufacturers 1 who define purchase reward offers 2, consumers 19 who qualify for the reward offers 2 by making required purchases which are tracked through a program management computer system (PMCS) 4, retail outlets 20 that assist in the tracking of required product purchases 28, and a central management firm 3 which controls the PMCS 4 and coordinates the interaction of the other participants. Each retail outlet 20 may be part of a retail chain, and the method of the present invention can be adapted for use at retail outlets 20 of different retail chains.

Manufacturers 1 are solicited by the central management firm 3 to define purchase reward offers 2. The purchase reward offers 2 can include standard rebates, trial rebates, gift offers, and sweepstakes offers. In the preferred embodiment of the marketing method, the purchase reward offers 2 require multiple purchases of a particular product type or brand, but a reward offer 2 may be offered for the purchase of a single item. The purchase reward offers 2 may also offer a reward for the combined purchases of several different products.

In the standard rebate offer, the manufacturer offers a refund for the purchase of a specified quantity of a particular product. Similarly, in the trial rebates, the manufacturer offers a substantial refund for an initial purchase of a particular product and reduced discounts on subsequent purchases of the same product.

The gift offers and sweepstakes offers can also be adapted to provide continuous purchase incentives. The manufacturer can offer to credit the consumer with points for each purchase of a particular product. A gift is earned when a particular number of points is attained by the consumer. Similarly, the manufacturer can offer an entry into a sweepstakes drawing for each product purchase.

Once the purchase reward offers 2 are defined by the manufacturer 1, the central management firm 3 stores records of the purchase reward offers 2 in an offer file 6, residing in the data bank of the PMCS 4. The products that are the subject of the purchase reward offers 2 have associated Universal Product Codes (UPC), which are used to access the reward offer records in the offer file 6. In the instance when a reward offer applies to several products, the UPC of each eligible product for the reward offer will access to the reward offer record to which the products apply. Each offer record contains an offer description, the offer purchase requirements, the offer value, the product UPC(s), and other information pertaining to the offer such as the manufacturer of the product(s).

When a consumer 19 joins the marketing program, the central management firm 3 issues the consumer 19 a consumer identification code 21a and a member identification card 21. In the preferred embodiment, the consumer identification code 21a is encoded in machine-readable format on the member identification card 21. The machine-readable code is preferably UPC bar-coding. Alternatively, the consumer identification code 21a can be imprinted in non machine-readable format on the member identification card 21.

In still another embodiment, the consumer identification code 21a is encoded on a card used for different purposes. For example, many banks issue debit cards to their customers which contain account information on a machine-readable magnetic stripe. Some retail stores have magnetic stripe scanners installed at their check-out terminals for allowing customers to use their debit cards to authorize the debiting of their bank accounts for the purchase amount. The consumer identification code 21a could be stored on the magnetic stripe of such a debit card, thereby providing more convenience to the consumer. Additionally, the consumer identification code 21a could be imprinted elsewhere in either machine-readable code or non machine-readable code on such a debit card and either scanned or read visually.

The central management firm 3 produces a reward booklet 16 to inform the consumer 19 of the reward offers 2 that are available. This reward booklet 16 is sent periodically to participating consumers 19. The booklet is also distributed to various other potential members through in-store display stands and target-market direct mail. In the preferred embodiment, the reward booklet 16 contains descriptions of the reward products 28 and details of the reward offer 2, purchase requirements, and rewards. Additionally, a list summarizing the product names and reward amounts is included.

When shopping, the consumer 19 uses the information in the reward booklet 16 to select reward products 28 at a participating retail store 20. In a preferred embodiment of the invention, the reward products 28 are also distinctively identified on the shelves at the retail store 20. This identification could be performed by use of stickers displaying a distinctive marketing program symbol or by signs located near the products.

After making his product selections 27 and 28, the consumer 19 presents identification card 21 and consumer identification code 21a at the check-out counter 25 of the retail store 20. In the preferred embodiment, the bar-coded identification card 21 is read by a bar-code scanner 26 installed at the check-out counter 25. Alternatively, the consumer identification code 21a is in one of the above-described non machine-readable formats and is entered manually either by the check-out clerk or the consumer 19. By requiring the presentation of the member identification card 21 and the consumer identification code 21a at the time of purchase, the present invention ensures that consumers 19 from different households do not combine their purchases towards earning rewards.

After the consumer 19 has been identified at the check-out terminal 25, the bar-codes for the consumer's 19 selected products 27 and 28 are read by the scanner 26. The scanner 26 transmits the information from these bar-codes to a program data collector 23 located in the retail store 20. Preferably, the program data collector 23 is a computer system supplied by the central management firm 3 to the retail store 20. The program data collector 23 comprises a data processor and a memory unit for receiving and storing the consumer identification code for the consumer 19 in association with the UPC coding information for the products purchased by the consumer 19 in purchases records 30.

Alternatively, the program data collector 23 can be a component part of the in-store computer 22 of the retail store 20. In this embodiment, the in-store computer 22 typically receives purchase information from the scanner 26 for accumulating sales data for the retail store 20. When the retail store 20 participates in the marketing program, the in-store computer 22 is programmed to additionally store the purchase records 30 for the marketing program. Each purchase record 30 contains consumer identification code 21a of the consumer 19 and the bar-code information of the products 27 and 28 purchased by the consumer 19.

At the end of each business day, the purchase records 30 are transferred from the participating retail store 20 to a PMCS data receiver 7 in the PMCS 4. The PMCS data receiver 7 includes a telecommunication system for communicating with the program data collector 23 and a data concentration file for storing the purchase records 30. Because the PMCS 4 stores the consumer identification codes for all participating consumers 19 and the UPC codes for the reward products 28, the marketing program can be provided to consumers 19 through a plurality of retail stores associated with different retail chains. In the preferred embodiment, the consumer 19 is able to make reward product 28 purchases at more than one retail store 20 and have the purchase credits combined in the PMCS 4.

Periodically, usually weekly, the purchase records 30 residing in the PMCS data receiver 7 are compared with the offer records in the offer file 6 to determine which purchases correspond to an available purchase reward offer 2. The reward product transaction data 30a is extracted from the purchase records 30. Using control files 5, the reward product transaction data 30a is sorted according to the consumer identification codes 21a and according to reward products 28 purchased.

Additionally, the control files 5 provide consumer linking information for grouping the reward product transaction data for consumers 19 who have a consumer relationship and request to have their purchases combined for the satisfaction of the reward offer requirements.

Additionally, the central management firm 3 uses the purchase records 30 stored in the PMCS data receiver 7 to analyze consumer purchase behavior. This information is critical to manufacturers and retailers for determining how to improve marketing strategies and inventory optimization. The purchase records 30 are processed according to parameters set in consumer behavior processing programs 14. The output of the consumer behavior processing 14 is used to prepare consumer behavior reports 14a which are sent to manufacturers 1 and retailers 20. The consumer behavior processing can be performed for the purchase records 30 which contain information regarding both reward and non-reward products. In addition, the purchase records 30 can be compared with the reward information stored in the offer file 6 to produce purchase data related only to reward products 28, which is processed for consumer behavior reports 14a.

The sorted reward product transaction data is then stored in a transaction data file 11. In a history product transaction data 30a according to consumer identification code 21a, and product history records 13 to the UPC information.

The PMCS 4 provides terminals for consumer service support 8. Representatives communicate with consumers 19 through 800 number telephone lines. The representatives use the terminals for receiving information from the consumer hi story records 12, the transaction data file 11, and the control files 5. The representatives in the customer service support 8 can make transaction corrections to the transaction data file 11 and consumer information corrections in the consumer history records 12. Additionally, the representatives can modify the consumer linking information stored in the control files 5 according to consumer requests.

Periodically, usually monthly, the consumer history files are used to create statement records 10a. The information in the statement records 10a is processed according to a mailer program 10b and sent to a printer 10c. With the formatted information, the printer produces a status report 17 for the consumer 19.

The status report 17 informs the consumer 19 of all his purchases of reward products 28. The status report 17 also indicates the number of additional purchases of each reward product 28 necessary to receive a reward as well as the reward amounts that have already been earned. In addition, the status report 17 informs the consumer 19 of the other product rewards available toward which the consumer 19 has made no purchases.

The consumer history records 12 store all the reward product transaction data 30a for each consumer 19. Using the control files 5 and the offer files 6, each consumer history record is processed to determine if the consumer 19 has made the required purchases to receive rewards. From this information, a reward certificate 18 is produced for the amount of all the rewards earned by the consumer 19.

The reward certificate 18 is sent to the consumer 19 with the monthly status report 17. The reward certificate 18 can be a negotiable check or a voucher to be redeemed at a participating retail store 20 for cash or credit toward product purchases. In the preferred embodiment, the reward certificates are bar-coded so that they may be read by the scanner 26 at the retail store 20. Redemption records 30 for the reward certificates 18 could then be stored in the program data collector 23 and periodically transferred to the PMCS 4. The central management firm 3 uses the redemption records 30 to audit the amount reimbursed to the retail store.

The product history records 13 are used to prepare reward product invoices 15 according to reward offer for the manufacturer 1. Based upon the reward product invoices 15, the manufacturer pays the central management firm 3 for those rewards earned and paid to consumers 19.

Through the status report 17 and the reward certificate 18, the marketing program of the present invention completely automates the purchase reward system from the consumer viewpoint and creates a convenient inducement for the consumer 19 to continue to purchase the reward products 28 over an extended period unlike the single purchase enticements of the prior art. The present invention also improves over the prior art reward systems by removing the need for the consumer 19 to collect proofs of purchase to be mailed to the manufacturers for refunds.

Figure 2:
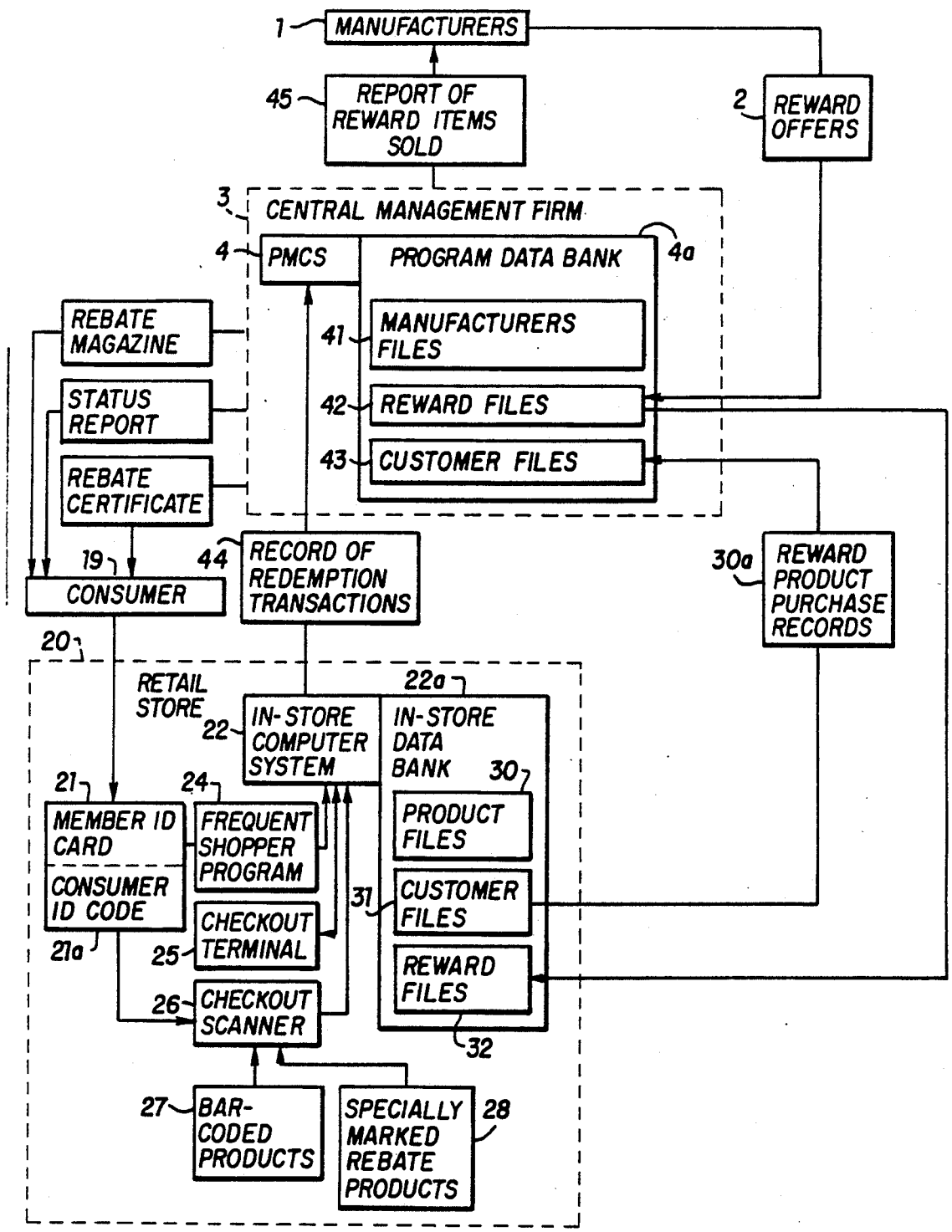
FIG. 2 shows a block diagram of the interaction of the various system components in an alternative embodiment of the present invention in which a retail store computer performs preliminary processing of the reward product purchase records.

Referring to FIG. 2, an alternative embodiment of the automated purchase reward system utilizes the in-store computer system 22 of the retail store 20 to perform some of the data processing of the purchase records 30a. Some retail stores equipped with scanners 26 and in-store computer systems 22 provide consumers 19 with bar-coded identification cards 21 so that transactions such as check-cashing may be recorded in the in-store computer 22. For retail stores 20 having a so-called frequent shopper program 24 in which bar-coded identification cards 21 are distributed, the preliminary preparation of the reward product purchase data 30a can be performed at the retail store 20 according to the method set forth below.

The principal components of the automated reward system in this embodiment are the program management computer system (PMCS) 4, maintained by the central management firm 3, and an in-store computer system 22 located in a retail store 20. The PMCS 4 is linked to the in-store computer system 22 so that periodic exchanges of data may occur between the two computer systems.

The in-store computer system 22 comprises an instore data bank 22a for storing a plurality of files. These files comprise product files 30 containing information related to store inventory, customer files 31 containing information related to consumers participating in a frequent shopper program 24, and reward files 32 containing information related to the purchase reward offers 2.

The in-store computer system 2 receives outputs from the check-out scanners 26 positioned near the checkout terminals 25. Each check-out terminal 25 comprises the conventional components of a keyboard for manual entries, a display, a cash register for storing payments, and a printer for producing receipts.

The PMCS 4 includes a program data bank 4a which stores reward files 42 and customer files 43 identical to those stored by the in-store data bank 22a as well as manufacturer files 41 containing information related to participating manufacturers 1 and their reward products 28.

When the consumer 19 joins the frequent shopper program 24, a customer file 31 is created for that consumer 19 in the in-store data bank 22a, and the consumer 19 receives a member identification card 21 and a consumer identification code 21a, which may be encoded on the member identification card 21 in machine-readable format. A copy of the customer file 31 is transferred to the program data bank 4a and stored in the customer file 43.

When the consumer 19 brings his products 27 and 28 to the check-out terminal 25, he presents his member identification card 21 for scanning. The in-store computer system 22 uses the consumer identification code 21a read by the scanner 26 to access his customer file 31 so that if any reward items 28 are purchased, a record of the purchase will be stored in the customer file 31.

Reward product purchase records 30 are transferred from the customer files 31 of the in-store data bank 22a to the customer files 43 in the program data bank 4a. From the reward product purchase records 30, the central management firm 3 prepares a status report 17 to be sent to the consumer 19.

The redemption and reimbursement process for the purchase reward program begins with the periodic transfer of reward product purchase records 30a from the in-store data bank 22a to the program data bank 4a. From these reward product purchase records 30a, the central management firm 3 determines the consumer's 19 earned rewards and sends a reward certificate 18 to the consumer 19 for those rewards earned.

The consumer 19 redeems the reward certificate 18 at the retail store 20. The reward certificate redemption transaction is recorded in the customer record 31 of the consumer 19. A member identification card 21 is required for the redemption transaction, giving the consumer 19 added security against fraudulent redemption by another.

Periodically, records of redemption transactions 44 are transferred to the program data bank 4a from the in-store data bank 22a. From these redemption records 44, the central management firm 3 determines the redemption amounts and reimburses the retail store 20. Finally, the central management firm 3 uses the reward files 42 to prepare a report of reward items sold 45 to send to the manufacturer 1.

In this embodiment of the purchase reward system, the retail store 20 can simultaneously offer purchase incentives with the purchase reward program administered by the central management firm 3. For instance, the retail store 20 may offer points according to the volume of purchases a consumer 19 makes at the retail store 20. Hence, the retail store 20 and the participating manufacturers 1 can increase consumer loyalty through the marketing method of the present invention.

While preferred embodiments of the invention have been shown and described, several other modifications and improvements to these preferred embodiments will be suggested to those skilled in the art. Accordingly, the invention should not be limited by the disclosure above, but only by the following claims:

We claim:

1. For use in a retail store point-of-sale system having terminals at customer check-out locations, an in-store computer system communicating with said terminals and having access to in-store data banks and a program management computer system remotely located from the retail store and communicating with said in-store computer system and having access to management data banks, a method for effecting manufacture purchase reward offers, comprising the steps of:

identifying products for which purchase reward offers will be provided;

compiling said purchase reward offers for circulation to potential offerees;

providing each of said potential offerees an identification card with a consumer identification code thereon;

storing information respecting said purchase reward offers in the in-store computer data banks and in the management data banks;

identifying an offeree at the point-of-sale terminal by reading the consumer identification code of the offeree;

comparing products purchased by said identified offeree at the point-of-salt terminal with the stored information respecting said purchase reward offers;

identifying purchase reward offers available to said identified offeree for the purchased products;

recording purchase transactions of products for which rewards will be provided; and providing on a periodic basis to said identified offeree a listing of said identified offeree's purchase transactions of products for which rewards are available to said identified offeree; and identifying in said listing said identified offeree's progress toward completion of the requirements for purchase reward offers available to said identified offeree.

2. The method of claim 1 wherein the consumer identification code is machine-readable.

3. The method of claim 1 wherein a record of purchase transactions is compiled in the in-store computer for each offeree.

4. The method of claim 3 wherein the record of the purchase transactions for each offeree are transferred to the management data base for compilation and transmission to the offeree.

5. The method of claim 1 wherein the record of the purchase transactions is compared with reward offer requirements indicated by the stored information respecting the reward offers to determined if a reward should be provided to the offeree.

6. The method of claim 1 wherein the products for which purchase rewards are offered are displayed at the retail store and are marked so that offerees may distinguish the reward products from non-reward products.

7. The method of claim 1, wherein the consumer identification code of the offeree is visually identified by retail store personnel at the consumer checkout location and manually entered in the terminal at the customer check-out location.

8. A method for effecting manufacturer purchase reward offers for use in a retail point-of-sale system having scanners at customer check-out locations and in-store program data collector, said data collector comprising data storage means and communicating with the scanners and with a remotely located program management computer system, comprising the steps of:

defining a plurality of purchase reward offers, each purchase reward offer promising a reward to a plurality of offerees for purchasing at least one reward product;

storing offer information regarding the plurality of purchase reward offers in an offer file in a management data bank of the program management computer system;

providing each offeree with a member identification card with a consumer identification code thereon;

identifying one of the plurality of offerees at one of the customer check-out locations by reading the consumer identification code of said one of the plurality of offerees;

reading product identification information from machine-readable codes affixed to products purchased by said identified one of the plurality of offerees with one of the scanners;

storing the product identification information in the data storage means with said consumer identification code, said consumer identification code and said product identification information forming a purchase record;

transferring the purchase record to a data receiver in the program management computer system;

comparing the product identification information with the reward offer information to determine which purchased products are reward products;

combining the determined reward product identification information with the product identification information of previously purchased reward products stored in a consumer history file in the management data bank;

comparing the reward product information in the consumer history file with the offer information to determine which rewards have been earned by said identified one of the plurality of offerees and further rewards available to said identified one of the plurality of offerees;

providing said identified one of the plurality of offerees with a reward certificate for the rewards earned; and providing said identified one of the plurality of offerees an outline of his or her progress towards completion of the requirements for a plurality of available rewards.

9. The method of claim 8 wherein the consumer identification code is machine-readable.

10. The method of claim 9 wherein the consumer identification code is stored on a magnetic stripe and the retail store point-of-sale system further provides a magnetic stripe reader for reading the consumer identification code.

11. The method of claim 10 wherein the member identification card is also a bank debit card.

12. The method of claim 8 wherein at least one of the purchase reward offers promises a reward for the purchase of at least two reward products.

13. The method of claim 8, further comprising the steps of:

transferring the determined reward product identification information from the data receiver to a transaction data file in the management data bank; and combining the reward product identification information of the offeree with reward product identification information of at least one other offeree according to an offeree linking control file.

14. The method of claim 8 wherein the reward products are displayed at a retail store and are marked so that the plurality of offerees can distinguish the reward products from non-reward products.

15. The method of claim 8 wherein the product identification information and the consumer identification codes are collected in a retail store computer, said retail store computer storing product identification information for sales and inventory purposes.

16. The method of claim 8, further comprising the step of compiling the offer information for distribution to the plurality of offerees.

17. The method of claim 16 wherein the offer information is compiled in a booklet.

18. The method of claim 8 wherein the reward certificate is imprinted with a machine-readable redemption code so that a record of the redemption of the reward certificate may be stored in the in-store data collector.

19. The method of claim 18 wherein the redemption of the reward certificate requires a reading of the consumer identification code of the member identification card.

20. The method of claim 7, wherein the reward certificate is a negotiable instrument or bank check.

21. The method of claim 7, wherein the consumer identification code of one of the plurality of offerees is visually identified by retail store personnel at the customer check-out location and manually entered into the point-of-sale system at the customer check-out location.

* * * * *